Feb. 16, 1965 A. R. BENTSEN 3,169,772

COMPACT CONSOLE PHONOGRAPH

Filed June 1, 1962 2 Sheets-Sheet 1

INVENTOR:
ARTHUR R. BENTSEN,

BY Norman C. Fulmer
HIS ATTORNEY.

Feb. 16, 1965 | A. R. BENTSEN | 3,169,772

COMPACT CONSOLE PHONOGRAPH

Filed June 1, 1962 | 2 Sheets-Sheet 2

INVENTOR:
ARTHUR R. BENTSEN,

BY Norman C. Fulmer

HIS ATTORNEY.

3,169,772

COMPACT CONSOLE PHONOGRAPH

Arthur R. Bentsen, Liverpool, N.Y., assignor to General Electric Company, a corporation of New York Filed June 1, 1962, Ser. No. 199,322
13 Claims. (Cl. 274—2)

This invention relates to phonographs, and particularly to a new compact console type of phonograph.

Phonographs may be classified into two general types: portable and console. Portable phonographs are usually provided with a carrying handle, and are sufficiently small and light-weight to be carried easily. Console phonographs usually are incorporated into relatively large and heavy cabinets intended to rest on the floor in a relatively permanent location. The console phonographs are characterized by a relatively better audio quality or fidelity, whereas portable phonographs are characterized by their feature of portability.

An object of the invention is to provide a new type of phonograph which generally lies between the portable and console types.

Another object is to provide a phonograph generally of the console type, which is compact and versatile as to location and arrangement in a room.

A further object is to provide a console type of phonograph which has a relatively shallow depth.

A still further object is to provide a phonograph which can readily be attached to or built into a wall of a room.

Still other objects will be apparent from the following description and claims, and from the drawing in which:

The phonograph of the invention comprises, basically and in its preferred embodiment, a phonograph cabinet having a tilt-down type of stereo record player and a record storage compartment arranged side-by-side, and a pair of loudspeaker-containing doors arranged to alternatively close respectively over the record player and record storage compartment or to open beyond the sides of the cabinet. A base of the cabinet extends forwardly under the closed position of the loudspeaker doors. The loudspeaker doors are acoustically transparent on both sides thereof, so that sound will be radiated forwardly of the cabinet whether the doors are open or closed. Control knobs and dials are arranged along the upper part of the front of the cabinet so as to be covered by the loudspeaker doors when in closed position. The aforesaid combination provides a high-quality stereo phonograph of pleasing appearance and having a shallow depth which achieves the objectives of compactness and versatility, and enables the phonograph to be mounted on or into a wall of a room.

Figures 1, 2, 3, 4, 5, 6, 11:
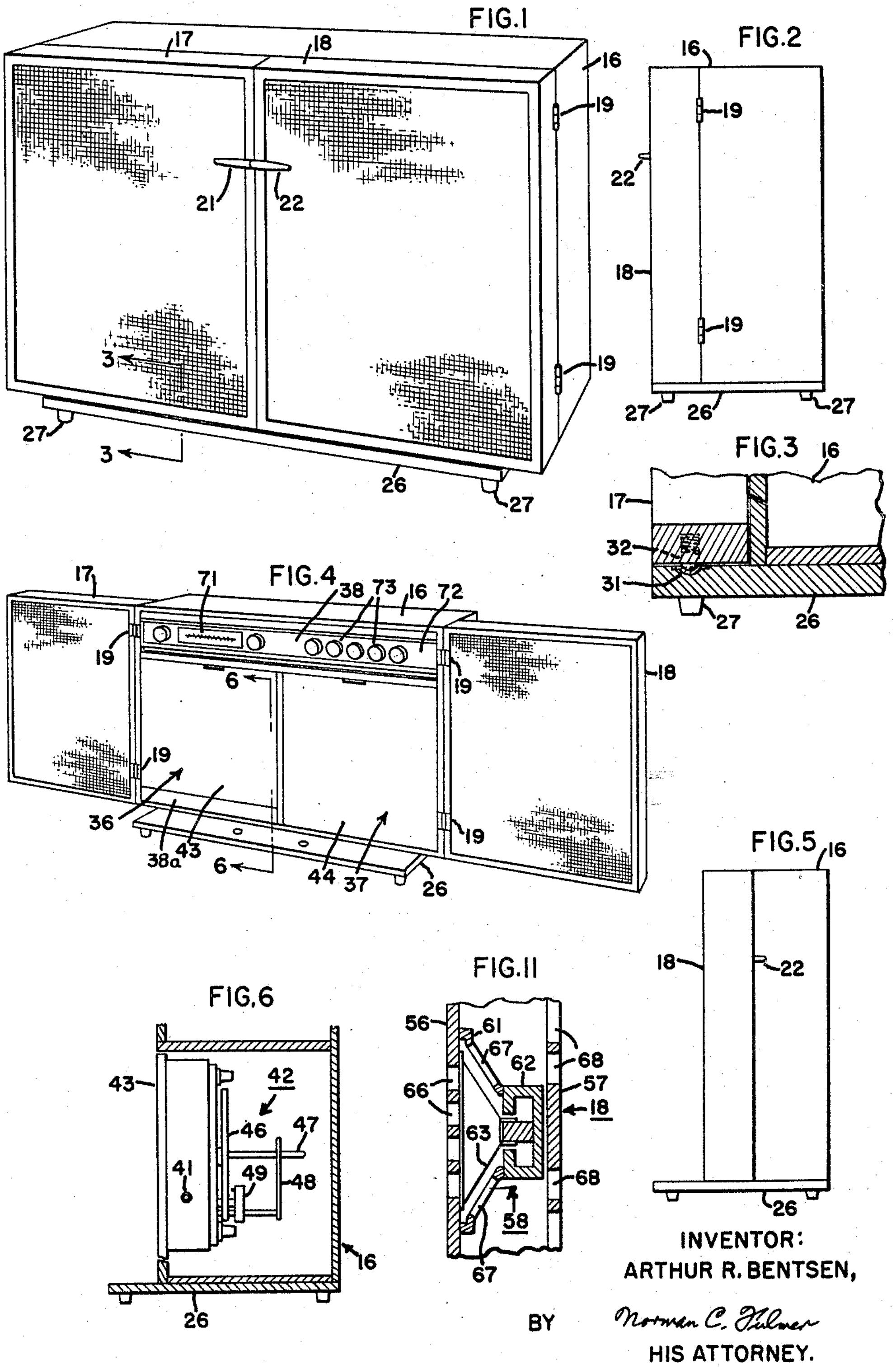
FIGURE 1 is a perspective view of a phonograph, in accordance with a preferred embodiment of the invention, shown with loudspeaker-containing doors thereof in closed position.
FIGURE 2 is a right-side view of the phonograph shown in FIGURE 1.
FIGURE 3 is a cross-sectional view taken on the line 3—3 of FIGURE 1.
FIGURE 4 is a perspective view of the preferred embodiment of the invention, with the loudspeaker-containing doors thereof in open or operative position.
FIGURE 5 is a side view of FIGURE 4, looking toward the right-hand end thereof.
FIGURE 6 is a cross-sectional view of FIGURE 4, taken on the line 6—6 thereof.
FIGURE 11 is a cross-sectional view of FIGURE 7, taken on the line 11—11 thereof.
Figure 7:
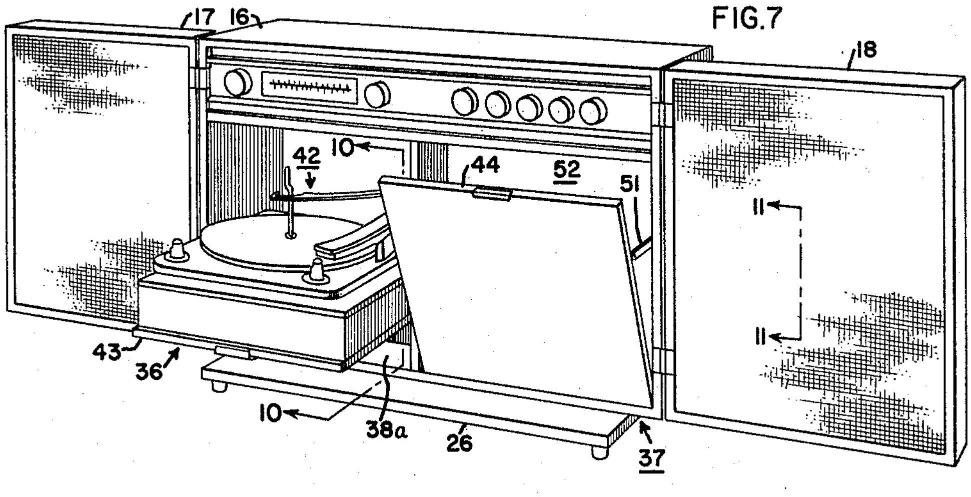
FIGURE 7 is a perspective view of the preferred embodiment of the invention, with the record player in operating position, and with a record storage compartment in open position.
Figure 8:
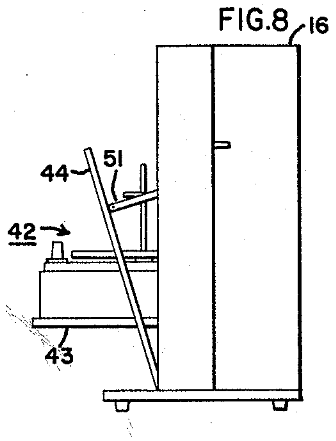
FIGURE 8 is a side view of FIGURE 7, looking toward the right-hand side thereof.
Figure 10:
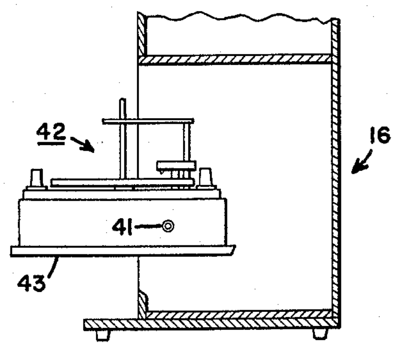
FIGURE 10 is a cross-sectional view of FIGURE 7, taken on the line 10—10 thereof.
Figure 9:
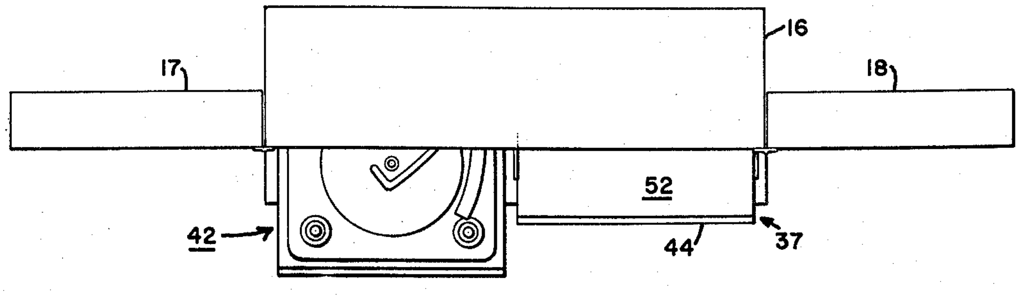
FIGURE 9 is a top view of FIGURE 7.

Now referring to the drawing, the preferred embodiment of the phonograph comprises a cabinet 16 provided with a pair of doors 17, 18 of equal size and shape, and respectively hinged at their outer extremities to the cabinet 16 as indicated at 19. The doors 17, 18 are provided with handles 21, 22 for use in opening them. The doors 17 and 18, which are relatively thin and approximately 3 inches thick in the preferred embodiment, each contain one or more loudspeakers. The loudspeakers in each door are respectively connected to the two stereophonic signal channels, so that each door becomes a reproducer for a different one of the stereophonic channels. The loudspeaker doors 17, 18 are acoustically transparent on both sides thereof, as will be described later in connection with FIGURE 11, so that full stereophonic separation will be achieved when these doors are in open position as shown in FIGURE 4, and these loudspeaker doors can be utilized in closed position as shown in FIGURE 1 for a lesser stereo effect, or for monaural sound when a monaural radio tuner is being used. If desired, a pair of hinges may be used at 19 for each door, as shown, to provide electrical connections to the loudspeakers contained in the doors, thereby eliminating the necessity of wire connections.

A base 26 is attached to the underside of the cabinet 16, and extends frontwardly of the cabinet and underneath the closed position of the doors 17 and 18, as clearly shown in FIGURES 1–4. Bumper feet 27 of rubber or other suitable material, may be provided on the underside of the base 26, for use when the phonograph is rested on a floor or table. The base 26 keeps the cabinet 16 stably in position while the loudspeaker doors 17, 18 are being swung open, particularly when these doors are half-way open, i.e., when they are extending forwardly with respect to the cabinet 16. The frontwardly extending base 26 also functions to provide a catch for holding the doors 17, 18 in closed position. As shown in FIGURE 3, this catch may comprise a detent 31 in the base 26 beneath the closed location of each speaker door, and a spring-loaded ball 32 located in each of the speaker doors in alignment with the respective detents 31 when the doors are closed.

The phonograph cabinet 16 is provided with a record player 36 and a record storage compartment 37 arranged side by side, and a control panel 38 arranged across the upper part of the cabinet 16 above the record player 36 and record storage compartment 37. The record player 36 is attached to the cabinet 16 by means of pivots 41 so that the record player may be tilted to a vertical position when not in use, as shown in FIGURES 4 and 6, and may be tilted to a horizontal playing position for use, as shown in FIGURES 7–10. Thus, when in closed position, the record player 36 is positioned with its minimum dimension in the front to back direction, thereby permitting the cabinet 16 to have a minimum depth. In playing position, however, the record changer is tilted outwardly and downwardly from its closed position, so that it projects forwardly of the cabinet 16 for ready access thereto. The record player 36 can be supported in the horizontal position by any suitable stop means, such as a lip 38*a*. In the preferred embodiment, the record player 36 comprises a record changer mechanism 42 mounted on a base panel 43 which, when the record player is in the closed position, presents an attractive appearance which matches that of the record storage compartment panel 44. The record changer 42 comprises the usual turntable 46, spindle 47, overarm 48, and tone arm 49.

The record storage compartment 37 comprises a panel 44 which, like the record player panel 36, is flush with the front of the cabinet 16 when in closed position. The panel 44 is hinged along its lower edge, so that it can be tilted forwardly to an extent limited by a limiting arm 51, whereupon phonograph records may be inserted into or removed from the compartment or space behind the panel 44. The records are positioned in the storage space 52 in general parallelism to the panel 44.

Now referring to FIGURE 11, each loudspeaker door 17, 18 is constructed with a front panel 56 and a back panel 57, these panels being covered with ornamental grill cloth not shown in FIGURE 11. One or more loudspeakers 58 are positioned in each of the doors 17, 18, and comprise the usual frame 61, magnet assembly 62, and cone or diaphragm 63. Preferably, the loudspeaker is mounted with the cone 63 facing the front panel 56, this being the front of the loudspeaker doors when in open or widely spaced position as shown in FIGURE 4, and the front panel 56 is provided with one or more slots or openings 66 so as to be acoustically transparent to sound waves produced by the loudspeaker 58. The loudspeaker frame 61 is provided with one or more slots or openings 67 through which sound waves may travel rearwardly of the loudspeaker. One or more slots or openings 68 are provided in the back panel 57 of each loudspeaker door, to render it acoustically transparent so that sound waves can travel therethrough. Thus, since sound emanates from both the front and back of each loudspeaker door, the phonograph can be used for playing stereo records with the loudspeaker doors 17 and 18 in open position to provide suitable spaced stereo separation, and for this use the loudspeakers are facing forwardly to provide best response. However, when the phonograph is provided with a radio tuner 71 as shown in a preferred embodiment, the loudspeaker doors 17, 18 may be closed (especially when monaural radio reception is being used) and suitable sound waves will emanate frontwardly from the system with the doors in closed position.

In the preferred embodiment of the invention, the radio tuner 71, and an amplifier 72 for the tuner 71 and record player 42 and having control knobs 73, are arranged on the panel 38 across the upper part of the front of the cabinet 16. The amplifier 72 is a two-chanel stereo amplifier and the signal outputs of the two channels are respectively connected to the loudspeakers in the doors 17, 18 via wires or the hinges 19.

From the foregoing description and from the drawing, it will readily be appreciated that I have provided an attractive and compact phonograph or phonograph and radio combination, which is versatile as to location or arrangement, inasmuch as it is shallow in depth and can be hung on a wall without protruding unduly therefrom, and can also be rested on a floor or table. One important reason why the stereo phonograph unit of my invention is characterized by shallowness in depth is that the tilt-down record player, when it is closed, is compactly arranged in sandwiched relationship between the closed loudspeaker doors and the rear of the cabinet. The cabinet 16 may be mounted into a wall of a room, and will project only slightly therefrom, enabling the loudspeaker doors 17, 18 to be opened for stereo separation, in which event the loudspeaker doors will be positioned slightly in front of the room wall.

If desired, the invention may be adapted for a monaural phonograph, by employing only the left-hand part of the phonograph shown in the drawings. Thus, a single loudspeaker door 17 would be arranged to alternatively close in front of, or swing to the side of, a tilt-down record player 38 when not in use.

While a preferred embodiment of the invention has been shown and described, various other embodiments and modifications will be apparent to those skilled in the art, and are included in the scope of invention as defined in the following claims.

What I claim is:

1. In a phonograph unit of the type operably accessible from the front thereof, a cabinet characterized by relative thinness between its front and rear for enabling it to be mounted on the vertical wall of a room, said cabinet having an opening in the front thereof and a top having a substantially uninterrupted surface, a record player pivoted in said cabinet at said opening so as to be alternatively tilted to a vertical position in said cabinet for storage and to a horizontal position for use, and a door containing loudspeaker means and hinged to said cabinet to be alternatively opened to a position sideways of said cabinet and closed to a position in front of said record player, said record player being arranged in sandwiched relationship between said door and the rear of said cabinet when said player is in its vertical position and said door is in its closed position.

2. A phonograph as claimed in claim 1, in which said record player is pivoted at a point so as to extend forwardly of said cabinet when in said horizontal position.

3. A phonograph as claimed in claim 1, in which said door is acoustically transparent at both sides thereof whereby sound from said loudspeaker means will emanate from both sides of said door.

4. A phonograph as claimed in claim 1, including a base member attached to the underside of said cabinet and extending frontwardly thereof beneath the closed position of said door.

5. A phonograph as claimed in claim 4, including cooperative catch members located on said base member and on the underside of said door for holding said door in closed position.

6. A stereo phonograph of the type operably accessible from the front thereof, said phonograph comprising a cabinet having a record player and a record storage compartment in side-by-side relationship therein, said cabinet having a relatively small dimension between its front and rear and a top having a substantially uninterrupted surface, an opening in the front of said cabinet for containing said record player, said record player being pivoted in said cabinet at said opening so as to be alternatively tilted to a vertical position in said cabinet for storage and to a horizontal position for use, and a pair of doors containing loudspeaker means and respectively hinged to said cabinet at the opposite ends thereof to be alternatively opened to positions respectively sideways of said cabinet and closed to positions respectively in front of said record player and said record storage compartment, said record player being arranged in sandwiched relationship between one of said doors and the rear of said cabinet when said player is in the vertical position and said one door is in its closed position, and said record storage compartment being sandwiched between the other one of said doors and the rear of said cabinet when said other door is in the closed position.

7. A phonograph as claimed in claim 6, in which said record player is provided with a base comprising a panel adapted to fit said opening when the record player is in vertical position, and in which said record storage compartment comprises an opening in the front of said cabinet and a panel arranged to alternatively open from and close to fit said last-named opening.

8. A phonograph as claimed in claim 6, in which said record player is pivoted at a point so as to extend forwardly of said cabinet when in said horizontal position.

9. A phonograph as claimed in claim 6, in which each of said doors is acoustically transparent at both sides thereof whereby sound from said loudspeaker means will emanate from both sides of said doors.

10. A phonograph as claimed in claim 6, including a base member attached to the underside of said cabinet and extending frontwardly thereof beneath the closd positions of both of said doors.

11. A phonograph as claimed in claim 6, including cooperative catch members respectively located on the undersides of said doors and on said base member for holding said doors in closed position.

12. A phonograph as claimed in claim 6, including a horizontal elongated panel positioned in said cabinet above said record player and record storage compartment and provided with an amplifier, and control means for said amplifier mounted at the front of said panel.

13. In a phonograph unit of the type operably accessible from the front thereof, a cabinet characterized by relative thinness between its front and rear, said cabinet having an opening in the front thereof and a top having a substantially uninterrupted surface, a record player pivoted in said cabinet at said opening so as to be alternatively tilted to a vertical position in said cabinet for storage and to a horizontal position for use, and a pair of doors containing loudspeaker means, said doors being respectively hinged to said cabinet at opposite ends thereof to be alternatively opened to positions respectively sideways of said cabinet and closed to positions respectively in front of said cabinet, said player being arranged in sandwiched relationship between at least one of said doors and the rear of said cabinet when said player is in its vertical position and said doors are in their closed positions, thereby to provide a compact overall phonograph unit.

References Cited in the file of this patent

UNITED STATES PATENTS

| | | |
|---|---|---|
| 3,090,462 | Huff | May 21, 1963 |

FOREIGN PATENTS

| | | |
|---|---|---|
| 834,595 | Germany | Mar. 20, 1952 |
| 1,215,356 | France | Apr. 19, 1960 |